(12) United States Patent
Saleh et al.

(10) Patent No.: US 8,487,977 B2
(45) Date of Patent: Jul. 16, 2013

(54) METHOD AND APPARATUS TO VIRTUALIZE PEOPLE WITH 3D EFFECT INTO A REMOTE ROOM ON A TELEPRESENCE CALL FOR TRUE IN PERSON EXPERIENCE

(75) Inventors: Youssef Saleh, Arlington, MA (US); Gopal Paripally, N. Andover, MA (US)

(73) Assignee: Polycom, Inc., San Jose, CA (US)

( * ) Notice: Subject to any disclaimer, the term of this patent is extended or adjusted under 35 U.S.C. 154(b) by 793 days.

(21) Appl. No.: 12/694,109

(22) Filed: Jan. 26, 2010

(65) Prior Publication Data

US 2011/0181685 A1    Jul. 28, 2011

(51) Int. Cl.
*H01J 29/50* (2006.01)
*H04N 7/14* (2006.01)
*G09B 19/00* (2006.01)

(52) U.S. Cl.
USPC ........ 348/14.08; 313/417; 313/495; 315/154; 315/382; 345/102; 345/175; 345/547; 345/602; 348/14.07; 348/14.16; 348/211.12; 348/446; 348/602; 353/60; 358/1.15; 358/1.9; 358/474; 362/430; 374/162; 399/66; 434/38; 455/550.1

(58) Field of Classification Search
USPC ... 313/417, 496, 495; 315/154, 382; 345/102, 345/175, 547, 602; 348/14.07, 14.08, 211.12, 348/446, 453, 602, 14.16; 358/1.9, 1.15, 358/474; 362/430; 374/162; 399/66; 434/98; 455/550.1; 353/60
See application file for complete search history.

(56) References Cited

U.S. PATENT DOCUMENTS

| | | | |
|---|---|---|---|
| 4,501,931 A * | 2/1985 | Ohya et al. | 345/175 |
| 4,928,568 A * | 5/1990 | Snavely | 84/464 R |
| 5,742,329 A * | 4/1998 | Masunaga et al. | 348/14.07 |
| 5,999,214 A * | 12/1999 | Inagaki | 348/211.12 |
| 6,064,437 A * | 5/2000 | Phan et al. | 348/446 |
| 6,396,221 B1 * | 5/2002 | Uchida et al. | 315/382 |
| 6,476,544 B1 * | 11/2002 | Ishii et al. | 313/417 |
| 7,061,547 B2 * | 6/2006 | Wada | 348/602 |
| 7,227,567 B1 * | 6/2007 | Beck et al. | 348/14.07 |
| 7,291,966 B2 * | 11/2007 | Kaneko et al. | 313/496 |
| 7,384,155 B2 * | 6/2008 | Seki | 353/60 |
| 7,564,476 B1 * | 7/2009 | Coughlan et al. | 348/14.08 |
| 7,663,781 B2 * | 2/2010 | Song et al. | 358/1.9 |
| 7,839,542 B2 * | 11/2010 | Osari et al. | 358/474 |
| 8,199,185 B2 * | 6/2012 | McNelley et al. | 348/14.16 |
| 8,271,021 B2 * | 9/2012 | Jeong | 455/550.1 |
| 8,305,334 B2 * | 11/2012 | Arisato et al. | 345/102 |
| 2001/0013760 A1 * | 8/2001 | Uchida et al. | 315/382 |
| 2003/0169264 A1 * | 9/2003 | Emerson et al. | 345/547 |

(Continued)

*Primary Examiner* — Gerald Gauthier
(74) *Attorney, Agent, or Firm* — Wong, Cabello, Lutsch, Rutherford & Bruceuleri, L.L.P.

(57) ABSTRACT

A video conference system provides "in the room" telepresence to near end participants. The video conference system includes a frameless or bezelless display device placed in front of a front wall for displaying edge-to-edge 3D images of far end participants. Color of the near end front wall is configured to be the same as the color of the far end rear wall. As a result, images displayed on the display device can merge or blend into the near end front wall, giving the near end participants the perception that the far end participants are actually in the near end conference room. Brightness of the faces/bodies of the near end participants can also be adjusted to match the brightness of the face/bodies of the images of the far end participants as they appear on the display device—therefore enhancing the in the room perception of the far end participants.

25 Claims, 4 Drawing Sheets

U.S. PATENT DOCUMENTS

| | | | |
|---|---|---|---|
| 2006/0082591 A1* | 4/2006 | Emerson et al. | 345/602 |
| 2006/0114482 A1* | 6/2006 | Song et al. | 358/1.9 |
| 2007/0279680 A1* | 12/2007 | Kim | 358/1.15 |
| 2008/0151965 A1* | 6/2008 | Kim | 374/162 |
| 2009/0207126 A1* | 8/2009 | Arisato et al. | 345/102 |
| 2009/0244562 A1* | 10/2009 | Yasunaga et al. | 358/1.9 |
| 2010/0052548 A1* | 3/2010 | Allard et al. | 315/154 |
| 2010/0085480 A1* | 4/2010 | Katakame | 348/453 |
| 2010/0246197 A1* | 9/2010 | Takahashi et al. | 362/430 |
| 2011/0181685 A1* | 7/2011 | Saleh et al. | 348/14.08 |
| 2011/0306021 A1* | 12/2011 | Mutimear | 434/98 |
| 2012/0251151 A1* | 10/2012 | Shimba | 399/66 |

* cited by examiner

METHOD AND APPARATUS TO VIRTUALIZE PEOPLE WITH 3D EFFECT INTO A REMOTE ROOM ON A TELEPRESENCE CALL FOR TRUE IN PERSON EXPERIENCE

FIELD OF THE INVENTION

The present invention relates generally to videoconferencing systems, and more particularly to telepresence videoconferencing systems.

BACKGROUND

Videoconferencing systems are increasingly being used to conduct meetings when participants are present at different locations. Typically, videoconferencing is carried out by having video conferencing equipment at each end where the videoconferencing equipment is capable of capturing both video and audio of people participating in the videoconference. Communication is established by receiving video and audio from the far end and transmitting video and audio captured from the near end to the far end. The received video of the far end participants is typically displayed on display screens placed in front of the near end participants. The quality and level of interaction between the videoconference participants depends substantially on the manner in which the near end (far end) participants perceive the images of the far end (near end) participants displayed on the display screens.

Figure 1A:
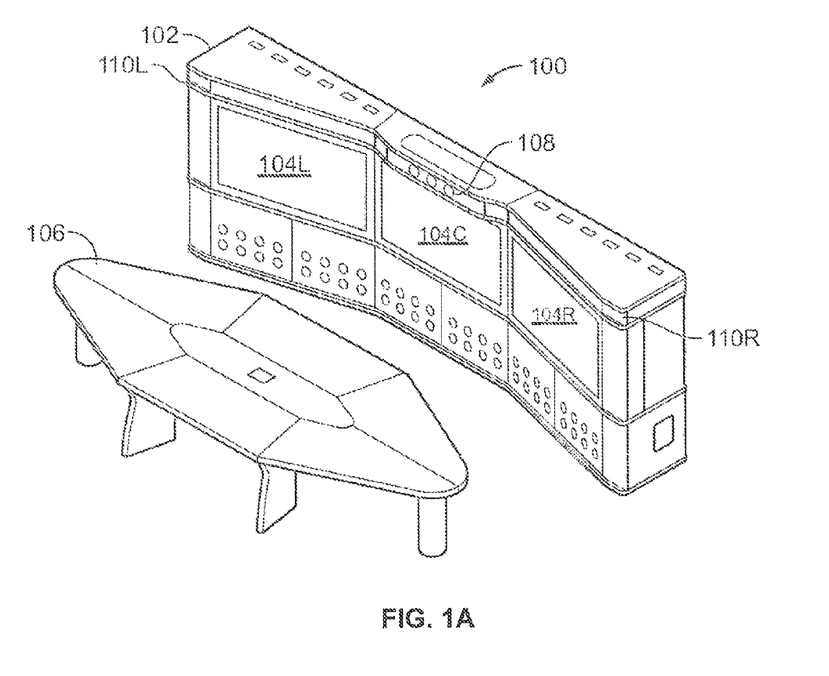
FIGS. 1A and 1B illustrate traditional telepresence video conference units and the near end participants' perception of the far end participants as displayed on the display screen.

FIG. 1A illustrates a traditional video conferencing system 100. Credenza 102 houses most of the system's electronic components. For example, the credenza 102 houses three camera units 108-LRC, three displays 104-LCR, two speakers 110-LR, and other equipment (e.g., communication hardware, power supplies, etc.). The near end participants seated at the table 106 can face the video conferencing system so that they can view the far end participants on the displays 104-LCR, and have their video and sound captured by camera units 108-LCR.

Figure 1B:
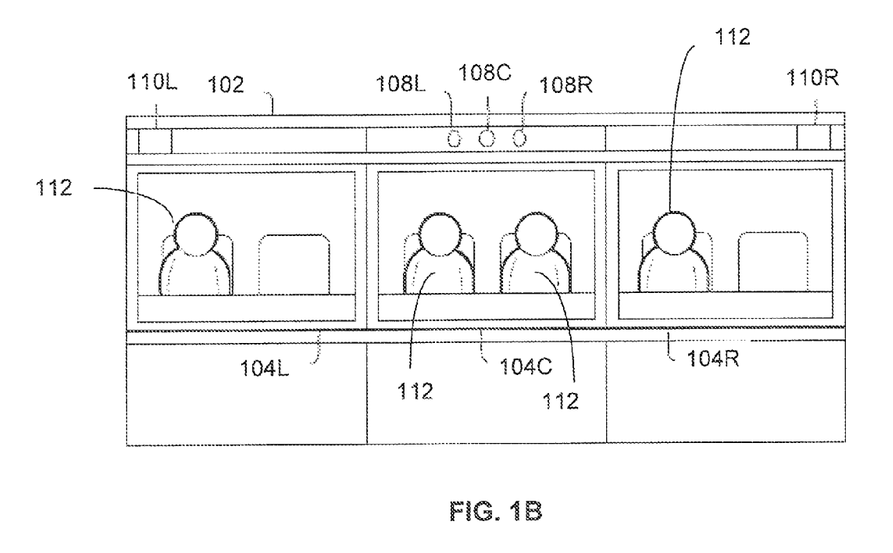

FIG. 1B illustrates a front view of the video conferencing system AC. This is what the near end participants would typically see while seated near table 106 (FIG. 1A) and facing the displays 104-LCR. As seen in FIG. 1B, each display 104-L, 104-C, and 104-R shows images of one or more far end participants 112. The far end participants appear within the credenza 102 and the frames 114 of the displays 104-LCR. Furthermore, the images of the far end participants displayed on displays 104-LCR will also include objects in the far end conference room that lie directly behind the far end participants. These far end conference room objects can appear out of place when seen by the near end participants who view the display screens 104-LCR with the backdrop of a front wall of the near end conference room.

The combination of the above factors in the displaying of far end participants to near end participants can create a perception of separation between the far end participants and the near end participants. Therefore, although the far end participants are clearly visible on to the near end participants, the frames and surroundings make the far end participants appear as if they were in another room behind the display. The perceived separation can hinder the level of interaction between the video conference participants. Individuals and businesses expend a large amount of resources toward travel for carrying out meetings that can be interactive and face to face. Providing video conferencing solutions that can provide a highly interactive conferencing experience is, therefore, highly desirable.

SUMMARY

A telepresence video conferencing system is disclosed that enables the perception of the far end conference participants being "in the near end conference room." A video conference unit capable of controlling various room functions of a conference room can be provided. A display device, controlled by the video conferencing unit, can be devoid of any frames of bezels. The frameless display device allows images to be displayed edge to edge.

In one embodiment, color of a front wall of the near end conference unit is configured to be the same as the color of the rear wall of the far end conference unit. When the display device displays images received from the far end conference unit, the images can include the far end participants as well as the far end rear wall appearing in the background. Because the color of the image of the far end rear wall displayed on the display device matches the color of the near end front wall, the near end participants get the perception that the image of the far end merges or blends with the near end front wall. Therefore, the near end participant can get the visual perception of the far end participants actually being present in the near end conferencing room.

In one embodiment, the display device can display 3D images of the far end participants. 3D images can provide depth perception, and can further enhance the perception of the far end participants being in the near end conferencing room.

In one embodiment, the conferencing unit can control the brightness of the local conferencing room lighting such that the brightness of the faces of the near end participants matches the brightness of the images of the far end participants displayed on the display screen. Even illumination of near end and far end participants can further enhance the perception of the far end participants being in the near end conferencing MOM.

In one embodiment, the near end conferencing room can include color light sources for illuminating the near end front wall. Therefore, in instances where the actual color of the near end conference room front wall is not the same as the color of the far end rear wall as seen on the display screen, the color light sources can be used to illuminate the near end front wall with a particular color such that the perceived color of the near end front wall substantially matches the color of the far end rear wall as seen on the display screen. The color light sources can be positioned behind the display screen and directed with appropriate angle such that at least the portions of the front wall along the periphery of the display device can be illuminated by the particular color.

In one embodiment the color information of the far end rear wall is received from the far end conference unit. In another embodiment, the color of the far end rear wall is determined at the near end conference unit. The conference unit can include sensors for monitoring the color of the image of the far end rear wall and also the perceived color of the near end front wall. The conference unit can use this information to continuously or periodically monitor and control the colors of the near end front wall.

BRIEF DESCRIPTION OF THE DRAWINGS

Exemplary embodiments of the present invention will be more readily understood from reading the following description and by reference to the accompanying drawings, in which.

DETAILED DESCRIPTION

Figure 2:
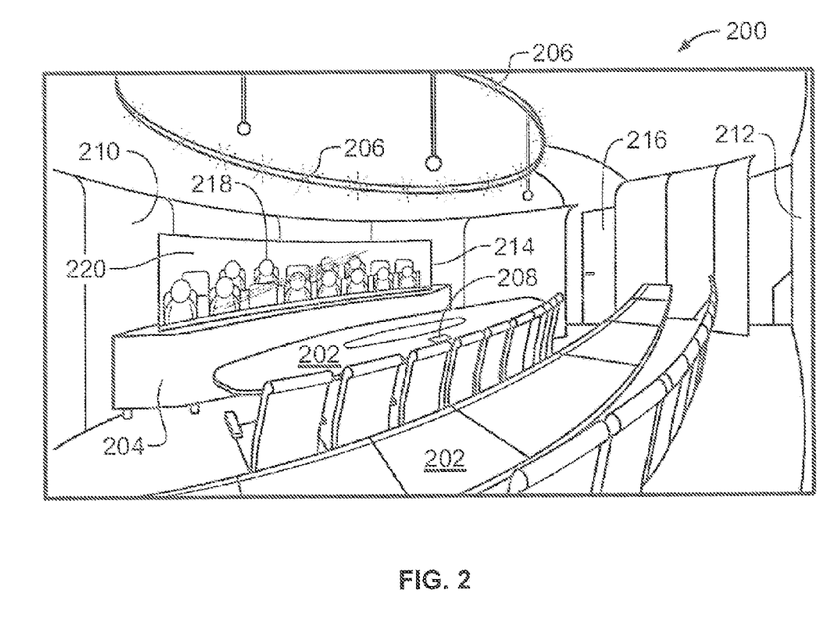
FIG. 2 illustrates a telepresence system that allows "in the room" perception of far end participants.

FIG. 2 illustrates an exemplary telepresence setup at a near end location. Near end conference room 200 includes conference room furniture 202 for seating near end participants (not shown), credenza 204 for supporting a display device 214, lighting equipment 206 for providing lighting to the conference room 200, video conference unit 208 for establishing and controlling video conference with far end participants, a front wall 210, a rear wall 212, etc. The conference unit 208, in addition to controlling communications with far end, can also control various aspects of the near end conference room 200. For example, the conference unit 208 can also control conference room lighting 206, the display device 214, external loudspeakers (not shown), powered door 216, powered windows, shades, or blinds (not shown), etc. The conference unit 208 may either control the above mentioned conference room functions directly or via room function controllers coupled to the conference room functions. Further details of controlling room functions via a conference unit are disclosed in commonly owned U.S. patent application Ser. No. 11/136,138, entitled "Conference unit controlling room functions," by Jeffery Rodman, and is incorporated herein by reference.

The conference room 200 in FIG. 2 provides an enhanced in person experience to the conference participants. The image of the far end participants 218 on the display device 214 can be displayed such that the far end participants 218 appear life-size to the near end participants. The size of the images of the far end participants can be chosen to be substantially equal to the size of the remote participants themselves, as they would appear to the near end participants if the far end participants were actually present in the conference room in front of them. Consequently, other far end participants sitting further behind a front row of far end participants can appear smaller—consistent with a natural perspective view. The sizes may vary from the actual size of the far end participants, as long as the image size can be perceived to be of the size of an average person. The near end participants can thus perceive a realistic presence of the far end participants in the near end conference room.

Additionally, the display device 214 can be devoid of any visible frame or bezel. Unlike the display 104-LCR shown in FIG. 1B the display device 214 in FIG. 2 can allow the images of the far end participants 218 to be extended to the edge of the display device 214. Furthermore, there are no vertical bezels appearing between the two vertical edges of the display device 214. As a result, the image of the far end participants 218 can appear as a continuous image on the display device 214. To the near end participants, the continuous, edge to edge, life size images of the far end participants 218 on the display device 214 can give a perception of the far end participants 218 being in the same room as the near end participants. This aspect can substantially enhance interaction between the near end and far end participants.

Display device 214 can use analog or digital technology for image reproduction. These may include cathode ray tube televisions, flat screen LCD, Plasma, projection, etc., having standard display resolutions e.g., 1280×720, 1920×1080, etc. For example, the display device can be 42 inches high and 150 inches wide 1920×1080 color LCD technology display. Alternatively, display device 214 can also employ ultra-short throw projection technology with an ultra contrast total internal reflection (e.g., lenticular) glass screen for creating an extremely thin display. Lenticular displays can also be employed to display virtual 3D images of the far end participants on the display device 214. Lenticular 3D display technology can use positive and negative parallax that gives the images of the far end participants a "mid-air" perception with a sense of "depth." The far end participants can appear to be "floating" on the display device 214.

The near end conference room 200 can be further designed in such a way that the color of the front wall 210, which is behind the display device 214, matches the color of the rear wall 220 at the far end. Note that the image of the far end participants 218 can include the far end participants along with the rear wall 220 of the far end conference room. When the color of the front wall 210 of the near end conference room matches with the color of the rear wall 220 of the far end conference room, the continuous, edge to edge, image appearing on the display device 214 can appear to merge into the near end front wall 210. As a result, the near end participants can perceive the far end participants 218 to be present in the near end room.

Similarly, the color of the front wall (not shown) of the far end conference room can match with the color of the rear wall 212 of the near end conference room. Thus, the image of the near end participants displayed on a far end display device (which can be similar to the near end display device 214) can give a perception that the near end participants are in the far end room.

In situations where the near end conference room front wall 210 does not match the color of the image of the far end rear wall 220, color lighting that can illuminate the near end front wall 210 (or a portion of the front wall 210 behind and around the periphery of the display device 214) such that the illuminated near end front wall 210 can have the same color as the color of the image of the far end rear wall 220 appearing on the display device 214. For example, if the color of the image of the far end rear wall 220 appearing on the display device 214 is yellow, while the color of the near end conference room front wall 210 is white, a yellow light illuminating the near end front wall 212 can be used. Therefore, the color of the front wall can be adjusted to the color of the image of the far end rear wall 220. In such cases, it may be preferable that the near end front wall have a neutral color (such as white) so that it can be perceived to have a color that is same as the color of the light illuminating it. This color adjustment of the near end front wall 210 can be carried out dynamically and automatically (as explained further below in detail).

In other situations where the near end front wall and the far end rear wall do have the same color, color lighting, albeit using only white light, can be used to illuminate the near end front wall 210 (or a portion of the front wall 210 behind and around the periphery of the display device 214) so that the brightness level of the front wall 210 perceived by the near end participants matches the brightness level of the image of the far end rear wall 220 appearing on the display device 214.

Figure 3A:
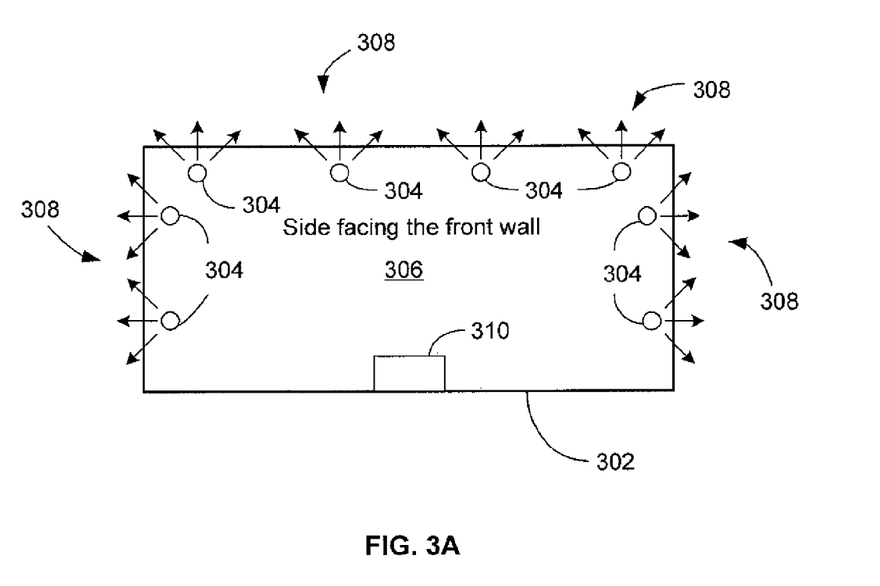
FIGS. 3A and 3B illustrate an example of the positions of color light sources for illuminating the near end front wall.

One exemplary way of illuminating the near end front wall 210 is shown in FIG. 3A. FIG. 3A shows a display device 302 having light sources 304 on the side 306 of the display device 302 that faces the front wall. Light sources 304 can be placed along the edge of the side 306 such that the light sources 304 can illuminate the near end front wall. The light sources 304 can be red-green-blue (RGB) light emitting diodes (LED) capable of producing light 308 composed of various proportions of the primary colors red, green, and blue. The light sources 304 can be controlled via a light source controller 310 that determines the color and intensity of the light emitted by the light sources 304. The light source controller 310 can receive color and intensity of the far end rear wall as displayed on the display screen (e.g., color of far end rear wall 220 as displayed on display device 214 in FIG. 2), and accordingly control the light emitted 308 by the light sources 304 such that the resulting color of the near end front wall matches the color of the far end rear wall as displayed on the display device 302.

Figure 3B:
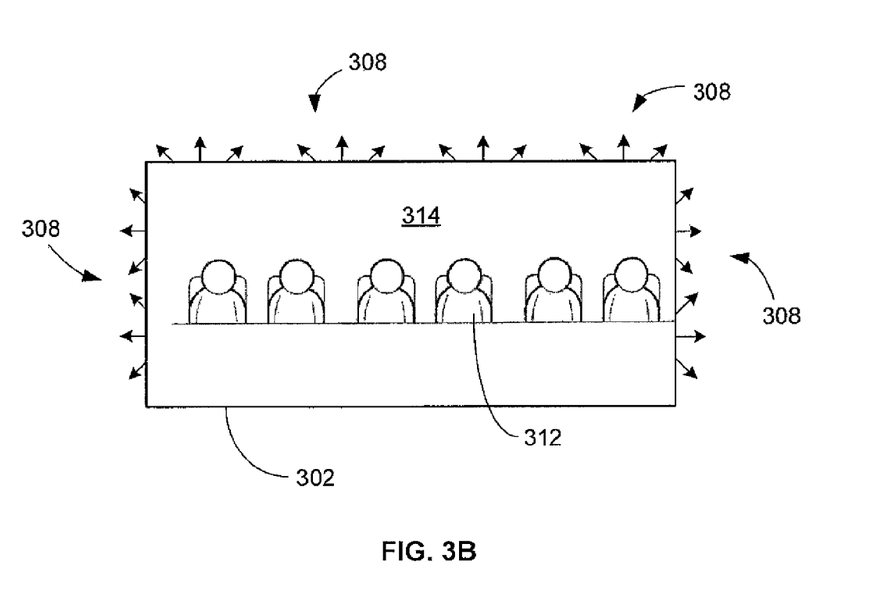

FIG. 3B shows the display device 302 as seen by near end participants. The display device 302 displays the far end conference participants 312 with the far end rear wall 314. The light source controller, FIG. 3A, 310, controls light sources 304 such that the light emitted 308 by the light sources 304 is of the same color and intensity as that of the displayed image of the far end rear wall 314.

The locations of the light sources 304 on side 306 of display device 302 is not limited to the ones shown in FIG. 3A. For example, the light sources can be placed closer to the periphery or further away from the periphery of the display device 302. The location may depend upon intensity of the light emitted by light sources 304.

The number of light sources 304 is also not limited to that shown (eight light sources) in FIG. 3A. For example, there may be just a single light source if that single light source provides sufficient light intensity on the near end front wall near the edges of the display device so that the color and brightness of the image of the far end rear wall 314 matches the apparent color and brightness of the near end front wall. Alternatively, if the intensity of light emitted by individual light sources is small, then more light sources can be used.

Other locations for light sources 304, as an alternative to, or in combination with, the locations on the display screen 302, can also be envisioned. For example, the light sources can be placed anywhere on the near end front wall itself. The light sources can be of the "wall wash lighting" type that can "paint" the near end front wall with the desired color and brightness. The wall wash lighting sources can be placed on the ceiling close to the near end front wall or can also be placed on the floor near the near end front wall. Wall wash lighting sources can also be placed between the display screen and the front wall away from the view of the near end participants. For example, referring to FIG. 2, lighting sources can be placed on top of the credenza 204 between the near end front wall 210 and behind the display device 214. Of course, the angle of placement of the lighting sources can be adjusted, e.g., upwards and sideways, to appropriately light the area of near end front wall that is near the display device and is visible to the near end participants.

The type of light sources is also not limited to the RGB LED type discussed with relation to FIG. 3A. Alternatively, various types of electroluminescent, incandescent, gas discharge, etc. types of lamps known in the art that can, individually or in combination, provide color illumination can be used.

Additionally, the amount of light falling on the near end participant's face/body can be adjusted to be the same as the apparent brightness of the image of the far end participant's face/body appearing on the display device. For example, referring again to FIG. 2, the intensity of light emitted from the lighting equipment 206 can be adjusted such that the brightness of face/body of near end participants (not shown) matches the brightness of the face/body of the far end participants 218 appearing on the display device 214. In this manner, a near end participant will feel as if the far end participants and his/her fellow near end participants to be illuminated by the same near end lighting equipment 206. This gives an additional visual perception far end participants being in the same room as that of the near end participants.

Figure 4:
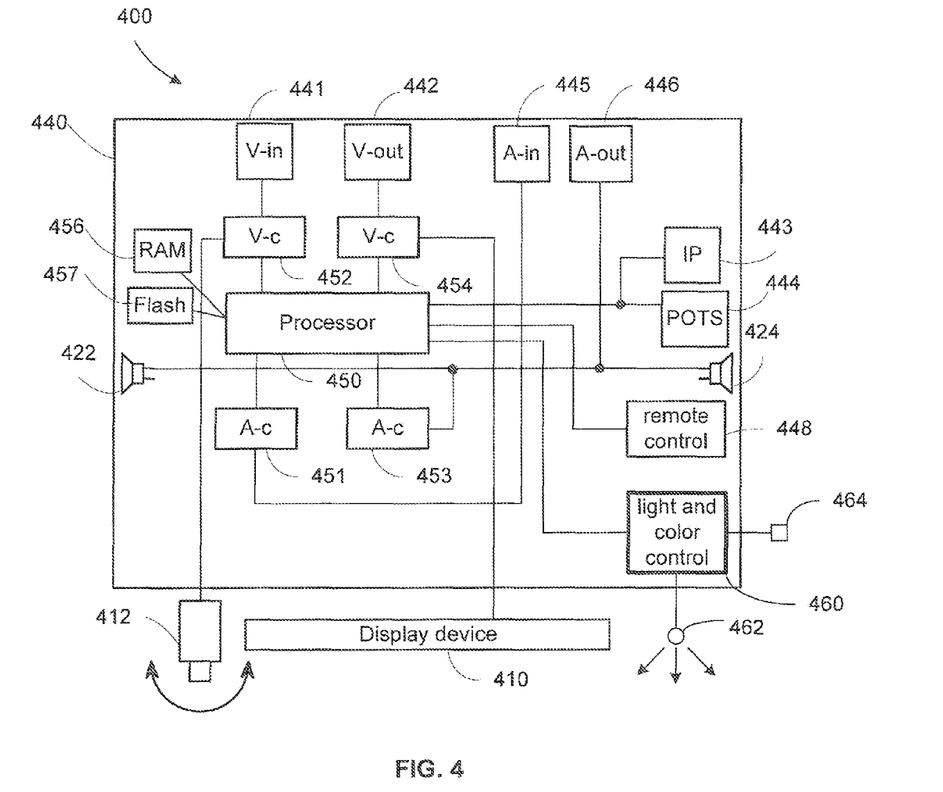
FIG. 4 illustrates an exemplar schematic of a near end conferencing unit.

Discussion now turns to the system that controls the operation of the near end video conference room. FIG. 4 illustrates a block diagram of a video conference unit 400. For example, the videoconference unit may depict the video conference unit 208 in FIG. 2. The video conference unit 400 has a central module 440, which has internal loudspeakers 422 and 424, a connection to the installed camera 412 and a connection to a display device 410. The central module 440 has many interfaces for additional video and audio components: video input interface 441, video output interface 442, audio input interface 445 and audio output interface 446. Each interface can have connections to multiple audio or video channels. For example, the video input interface 441 can accept video signals from two additional video cameras. The video output interface 442 may output two video channels for up to four monitors. The audio input interface 445 may accept up to twelve microphones, which can be grouped into up to four audio channels. The audio output interface 446 may output five more audio channels. Signal processing and control can be performed by the processor unit 450, which can be coupled to various audio/video components or interfaces through intermediates 451, 452, 453 and 454. Those intermediates 451-454 perform signal conversions, such as DAC, ADC etc. They are shown as separate blocks, but could be integrated into a single module or an integrated chip. The processor unit 450 can be supported by memory module 456 (typically RAM) and mass storage 457 (typically flash memory). Signal processing programs may be stored in the mass storage 457. Component profiles, which may be used in certain situations, can be stored there. The central module 440 can have several network interfaces, one interface 443 for a digital network, and another interface 444 for an analog network. Digital interface 443 may support various digital connections, such as ISDN, Ethernet, or USB. The ISDN connection is mainly used for a video conference connection through an ISDN network. The Ethernet or LAN connection is mainly used for video conference through the Internet or over a LAN. The USB connection may be used to exchange additional audio/video media stream, such as additional cameras, microphones, computers with additional documents etc. A remote control interface 448 is connected to the central module 440. The remote control interface 448 can receive control commands from a handheld remote control (not shown) and transmit the commands to the central module 440 to control the operation of the video conference unit 400.

The video conference unit 400 can also includes a controller 460 for light and color control. Controller 460 can be connected to one or more light sources 448. Light sources 448 can be the light sources 304 in FIGS. 3A and 3B. Additionally, controller 460 can also control all the lighting equipment 206 in the near end conference room 200. Controller 460 can output appropriate signals to the light sources 448 in order to control their color and intensity. Controller 460 can employ switches, relays, etc. for on/off operation of the light sources 448. Furthermore, components such as triacs, pulse width modulators (PWM), etc. can be employed by the controller 460 for controlling and varying the color and intensity of light emitted by light sources 448. For example, if the light source is an RGB LED, then PWM signals can be given to each of the R, G, and B inputs of the RGB LED. Then the pulse widths can be varied with respect to each other for controlling the color and the intensity of the light emitted by the RGB LED. Controller 460 can also include processing capability such as a microcontroller and memory. Furthermore, although the controller 460 is shown separate from the processor 450, the controller 460 and processor 450 can be one and the same device. For example, the functions performed by the controller 460 can be part of a program/subroutine of the processor 450 and stored in memory.

The output of the controller 460 can depend upon the colorimetric properties of the image of the far end rear wall displayed on the display device. The controller outputs the appropriate signals such that the color and intensity of the near end front wall around the display device matches the color and intensity of the image of the far end rear wall displayed on the display device. Controller 460 can receive information on the quantitative measure of the color and intensity of the far end rear wall. This information can be received by the controller 460 from various sources.

Note that the quantitative color representation of the far end rear wall can be in various formats known in the art for representing color. For example, the color information may be represented in RGB values, CMYK values, Hue Saturation and Brightness (HSV) values, luma (Y') and chrominance (U and V) values, etc. Color and brightness can also be represented in various color spaces known in the art, e.g., International Commission on Illumination (CIE) 1931 XYZ, CIE LUV, CIE UVW, CIELAB, ITU-R BT.709, ITU-R BT.601, etc. The processor 450 or controller 460, or both, can include standard conversion routines that can convert from one color space or representation to another.

Returning to the various sources the controller 460 can receive color information, in one instance, the source of color information can be the far end conferencing unit. Note that the near end and far end video conferencing units can communicate using protocols well known in the art, including H.224, H.225, H.281, H.261, H.263, H.320, H.323, etc. Using a signaling protocol such as H.225, near and far end video conferencing units can exchange configuration information that can include, among other things, color of their respective rear wall. This color information can be accompanied or associated with some kind of identification tag or label such as, for example, "REAR WALL COLOR." Alternatively, the near and far end video conferencing systems can use conference system and/or location identification as an indication of the rear wall color. For example, the near end videoconferencing system 400 can send a setup message via H.225, including its identification. In turn, the far end video conferencing system can respond with its own identification. The near end video conferencing unit 400 can use a cross-reference lookup in memory module 456 to access previously stored color information. This can be useful particularly when the near end participants communicate repeatedly with the same set of far end conference rooms.

Figure 5:
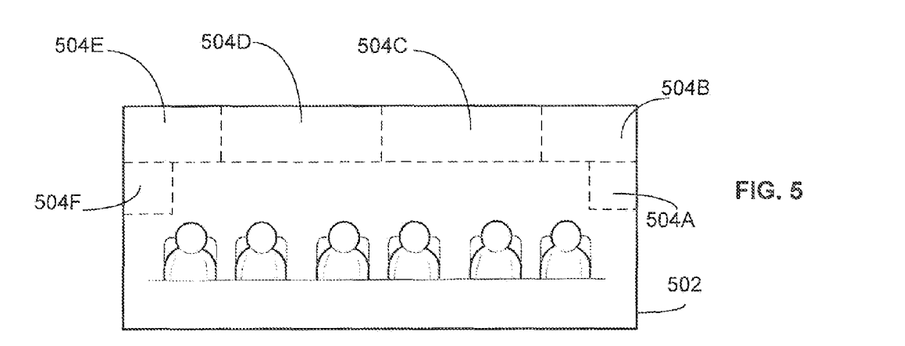
FIG. 5 illustrates an exemplary method for determining the color of the image of the far end rear wall.

In another instance, the source of far end rear wall color information can be the video stream received from the far end. In other words, the color of the image of the far end rear wall can be determined from the far end video stream. FIG. 5 shows an exemplary frame received from the far end. After or during decoding the incoming far end video stream, processor 450 can determine the color of one or more portions 504A, 504B, 504C, 504D, 504E, and 504D of the frame 502. The portions can be predetermined such that they predominantly capture the color of the far end rear wall appearing in the frame 502. Color information sent to the controller 460 can be an average of the color determined for all of the portions 504A-504F, or can include separate values for individual portions. If an average value is received by the controller 460, then the controller 460 can adjust the color of all the light sources 448 to the same received average color value. However, it is possible that the far end rear wall is not evenly illuminated throughout the area of the frame, in such cases separate color values, one for each portion 504A-504F can be received by the controller 460, and the controller 460 can adjust the color output of individual light sources 448 (for example, light sources 304 in FIG. 3A), so that the light emitted by the light source is such that the color of the portions 504A-504F of the frame match with the color of the portions of the of the near end front wall closest to the portions 504A-504F.

In another instance, the source of the far end rear wall color information can be one or more sensors (FIG. 4, 464) for sensing the color and brightness of the image of the far end rear wall appearing on the display device (e.g., 214 in FIG. 2). Sensors 464 can be placed proximal to the display device at a position that can allow the sensor 464 to accurately sense the color of the image of the far end rear wall. For example, the sensor 464 can be placed at the top right or left corner of the display device, or anywhere where it can accurately sense the color of the image of the far end rear wall appearing on the display device. Alternatively, the sensors 464 can be placed at a certain distance from the screen, e.g., on the ceiling or on the near end rear wall. Sensors 464 placed far away from the display device may require lenses and/or apertures to limit their field of view to a few degrees solid angle, and be properly directed so that they sense only the color of the image of the far end rear wall displayed on the display device. Furthermore, sensors 464 can be arranged so that they sense color of more than one portion of the image of the far end rear wall appearing on the display device. The color value determined by the sensors 464 can be communicated to the controller 460 and/or the processor 450, which, in turn, can control the output of the light sources 448 so that the color of the near end front wall near the display device matches the color of the image of the far end rear wall.

Additional color sensors 464 can be placed to sense the color of the near end front wall as well. The controller 460 can compare the value of the color of the near end front wall to the desired value of the color of the near end front wall. The desired color value can be the one received from the far end, determined by the processor 450 from the received far end image frame (FIG. 5), or sensed by the sensors 464, as described above. If the desired color value of the near end front wall does not match the measured color value, the controller 460 or the processor 450 can adjust the light emitted by the light sources 448 in order to bring the desired and measured color values to match. This provides a feedback loop to allow accurate color matching and to allow tracking any changes in the color of the image of the far end rear wall.

Because the color of the far end rear wall is typically constant over the period of a video conference call, the above methods of determining and monitoring color may need to be carried out only once during the establishment of a videoconference call. Alternatively, the processor 450 can periodically monitor changes in the color of the image of the far end rear wall and adjust the color of the near end front wall accordingly.

The near end conference unit 400 can also send information on color and brightness of the near end rear wall to the far end conference unit. This information can be determined by the conference unit 400 in several ways. In one instance, one or more color sensors 464 can be placed proximal to the near end rear wall to sense the color of the near end rear wall. Controller 460 or the processor 450 may calculate the average value of the readings form the one or more color sensors 464 and send this average value as representing the color of the near end rear wall. Alternatively, color information from one or more portions of the near end front wall can be sent to the far end conferencing unit. In another instance, the controller 460 or processor 450 can process image frames of the near end participants to determine the color of the near end rear wall. For example, the technique described in FIG. 5 for determining the color of the far end rear wall can be applied to determining the color of the near end rear wall, by processing the near end image frame instead of the received far end image frame. Color information sent to the far end may include identification tags that specify what portion of the near end front wall the color information is associated with.

Additionally, because the near end rear wall color information may stay the same over multiple conferencing sessions, this information can be stored in memory (FIG. 4, 456-457) and sent to the far end. As discussed previously, near end conference unit 400 and far end conference unit can exchange configuration information via signaling protocols such as H.225. Therefore, information on color and brightness of near end rear wall can be sent as part of the configuration information sent to the far end conferencing unit. The color information can be accompanied or associated with some kind of identification tag or label such as, for example, "REAR WALL COLOR," "REAR WALL CENTRE COLOR," "REAR WALL AVERAGE COLOR," "REAR WALL TOP RIGHT COLOR," etc.

Sensors 464 can be of the RGB photodiode type or can have photodiodes with RGB filters. Of course, sensors of color spaces other than RGB can also be used. Other color measuring instruments such as tristimulus colorimeters, spectroradiometer, spectrophotometer, spectrocolorimeter, etc., that are well known in the art can also be employed.

As described previously, the video conferencing unit 400 can also control the amount of light incident on the near end participants such that the brightness (or luminance) of face/body of near end participants matches the brightness of the face/body of the far end participants (e.g., FIG. 2, 218) appearing on the display device (e.g., FIG. 2, 214). Near end conference unit 400 can receive quantitative measure of the brightness of far end participants from the far end video conferencing unit. For example, the quantitative measure can be luminance intensity having units candela per square meter (cd/m$^2$). As described previously, this information can be part of the configuration information exchanged using signaling protocol such as H.225, and can be accompanied and associated with some sort of identification tag or label such as, for example, "FACE BRIGHTNESS."

Alternatively, the near end conference unit 400 can determine the brightness of the face/body of the far end participants as it appears in the video received from the far end. Processor 450 can carry out face detection on the received video to isolate the areas in the video that correspond to the faces/body of far end participants. The luminance of the isolated areas can then be determined from the pixels associated with the isolated areas. Typically, a face detection system can include a set of classifiers that have been previously trained (using learning methods such as neural networks, etc.) to classify the input pattern associated with features such as a face or a non-face. A fixed size window can scan every location within an image and extract image patterns that can be passed through classifiers to check for existence of a face. Once a face is recognized, the pixel information related to the isolated face can be processed to determine the amount of light incident on the face. It is not uncommon to represent the brightness or luminance of a pixel by taking the average of its R, G, and B values. The processor 450 may take an average of luminance of all the pixels as a measure for luminance. Alternatively, the processor 450 may select the highest luminance pixel value to represent the brightness. Further, where the received video includes more than one far end participants, the processor 450 may take an average over all the pixels associated with two or more far end participants.

The near end conference unit 400 can also send luminance intensity of the faces/bodies of the near end participants to the far end conference unit. This information can be included in the configuration information that can be sent to the far end using signaling protocol such as H.225. Such information can be accompanied and associated with an identification tag or label such as, for example, "FACE BRIGHTNESS." As one example, the luminance information can be measured using face detection techniques. A video of the near end participants can be analyzed by a face detection system to isolate the faces/bodies of near end participants. The face detection system described above with respect to detecting faces of far end participants in video received from the far end can also be used in detecting faces of near end participants in the video captured by the near end camera.

Brightness of the near end participants can also be measured by light meters with narrow field of view pre-positioned to point where participants would typically be seated. The measured luminance values can then be communicated to the near end conference unit 400, which in turn can communicate the luminance value to the far end conference unit.

With the brightness information of faces/bodies of both the near end participants and the far end participants as they appear on the display device is determined, the processor 450 and or light controller 460 can adjust the intensity of the conference room lights (e.g., FIG. 2, 206) such that the brightness of the faces/bodies of the near end participants matches the brightness of faces/bodies of far end participants as displayed on the display device. Control and adjustment of brightness can be carried out continuously during a video conference in order to tack any changes in the brightness of faces/bodies of the far end participants as they appear on the display device. Alternatively, brightness control and adjustment can be made periodically, or only once during a video conference.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A telepresence video conference unit comprising:
    a display device adapted to be placed in front of a near end front wall and configured to display an image of at least a portion of a far end rear wall; and
    a controller configured to control at least one color light source to illuminate at least a portion of the near end front wall such that a perceived color of the portion of the near end front wall matches a color of the image of the portion of the far end rear wall,
    wherein the display device is devoid of a frame or bezel.

2. The telepresence video conference unit of claim 1, wherein the at least one color light source is positioned on a side of the display device that faces the near end front wall.

3. The telepresence video conference unit of claim 1, wherein the controller is further configured to control one or more near end conference room lights such that a brightness of the face or body of at least one near end participant is substantially the same as a brightness of an image of the face or body of at least one far end participant displayed on the display screen.

4. The telepresence video conferencing unit of claim 1, wherein the display device is configured to display images in 3D.

5. The telepresence video conference unit of claim 1, wherein the color of the image of the portion of the far end rear wall is received from the far end conference unit.

6. The telepresence video conference unit of claim 5, wherein the controller determines the color of the image of the portion of the far end rear wall from at least one video frame received from the far end conference unit.

7. The telepresence video conference unit of claim 5, wherein the controller determines the color of the image of the portion of the far end rear wall from at least one identification tag received from the far end conferencing unit.

8. The telepresence video conference unit of claim 6, wherein the controller determines the color of the image of the portion of the far end rear wall from at least one subframe of the at least one video frame received from the far end conference unit.

9. The telepresence video conference unit of claim 3, wherein information of the brightness of an image of the face or body of at least one far end participant displayed on the display screen is received from the far end conference device.

10. The telepresence video conference unit of claim 9, wherein information of the brightness of an image of the face or body of at least one far end participant displayed on the display screen is determined by the controller from at least one video frame received from the far end conference unit.

11. The telepresence video conference unit of claim 9, wherein the controller determines the brightness of an image of the face or body of at least one far end participant from at least one identification tag received from the far end conferencing unit.

12. A method for telepresence video conferencing between a near end conference unit a far end conferencing unit comprising:
  displaying an image of at least a portion of a far end rear wall on a display device adapted to be placed in front of a near end front wall; and
  illuminating at least a portion of the near end front wall such that a perceived color of the portion matches a color of the image of the portion of the far end rear wall,
  wherein the display device is devoid of a frame or bezel.

13. The method of claim 12, further comprising positioning the at least one color light source on a side of the display device that faces the near end front wall.

14. The method of claim 12, further comprising controlling one or more near end conferencing room lights such that a brightness of the face or body of at least one near end participant matches a brightness of an image of the face or body of at least one far end participant displayed on the display screen.

15. The method of claim 12, further comprising displaying an image of at least one far end participant on the display device in 3D.

16. The method of claim 12, further comprising receiving information on the color of the image of the portion of the far end rear wall from the far end conferencing unit.

17. The method of claim 16, further comprising determining the color of the image of the portion of the far end rear wall from at least one video frame received from the far end conference unit.

18. The method of claim 16, further comprising determining the color of the image of the portion of the far end rear wall from at least one identification tag received from the far end conference unit.

19. The method of claim 14, further comprising receiving information of the brightness of the image of the face or body of at least one far end participant from the far end conferencing unit.

20. The method of claim 19, further comprising determining the brightness of the image of the face or body of at least one far end participant displayed on the display screen from at least one video frame received from the far end conferencing unit.

21. The method of claim 19, further comprising determining the brightness of the image of the face or body of at least one far end participant from at least one identification tag received from the far end conference unit.

22. A telepresence video conferencing unit comprising:
  a controller configured to transmit color information of at least one portion of a near end rear wall and at least one label for identifying the color information to be associated with the at least one portion of the near end rear wall.

23. The telepresence video conferencing unit of claim 22, wherein the controller is further configured to transmit brightness information of a face or body of at least one near end participant and at least one label identifying the brightness information to be associated with the face or body of at least one near end participant.

24. The telepresence video conferencing unit of claim 22, wherein the controller determines color information of the at least one portion of the near end wall from pixels associated with the at least one portion of the near end wall in a near end video frame.

25. The telepresence video conferencing unit of claim 23, wherein the controller determines brightness information of the face or body of the at least one near end participant from pixels associated with the face or body of the at least one near end participant in a near end video frame.

* * * * *